Sept. 16, 1958  R. L. PLOUFFE, JR  2,852,769
TIME INTERVAL MULTIPLIER
Filed Aug. 18, 1955  2 Sheets-Sheet 1
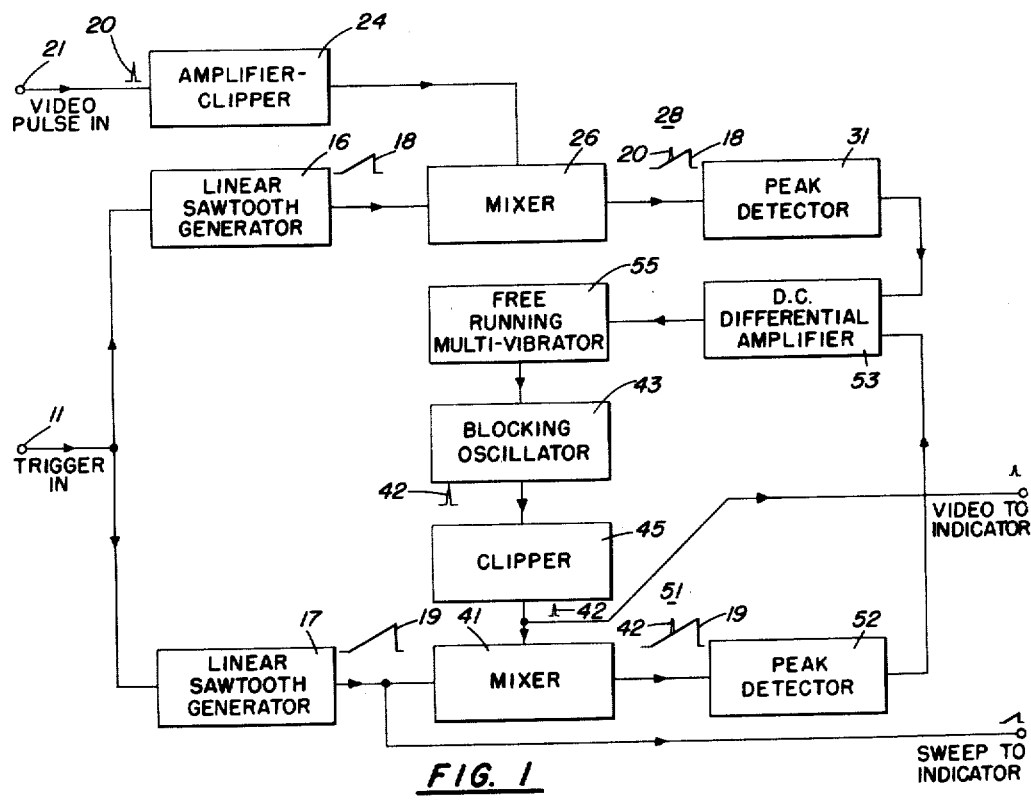
FIG. 1
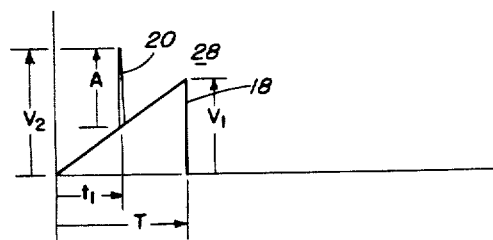
FIG. 2
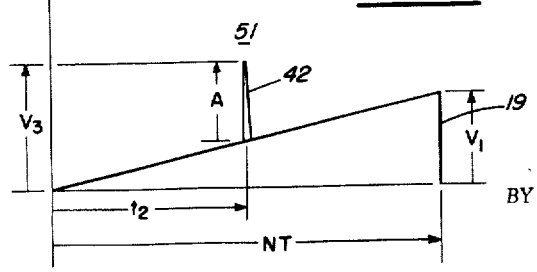
INVENTOR
ROBERT L. PLOUFFE, JR.
BY
ATTORNEYS

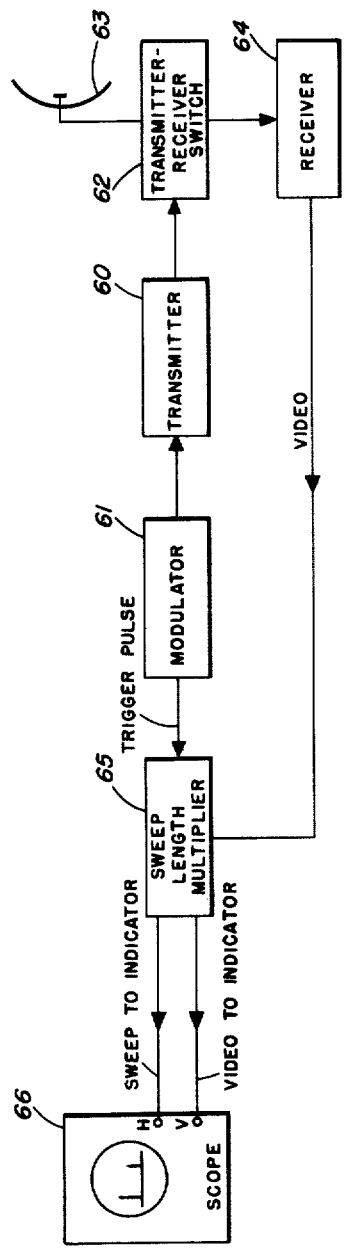

United States Patent Office
2,852,769
Patented Sept. 16, 1958

2,852,769
TIME INTERVAL MULTIPLIER

Robert L. Plouffe, Jr., Livingston, N. J., assignor, by mesne assignments, to the United States of America as represented by the Secretary of the Navy Application August 18, 1955, Serial No. 529,371

10 Claims. (Cl. 343—17.1)

The present invention relates to a time interval multiplier and more particularly to a time interval multiplier for multiplying the time interval between each pulse from one pulse train and each corresponding successive pulse from another pulse train.

Ordinarily, in radar indicators, it is necessary to have a correspondence between time and distance of 12.3 microseconds per nautical mile (twice the distance from transmitter to object divided by the speed of electromagnetic propagation). If a long sweep is employed, radar pulses reflected or initiated from nearby objects will appear adjacent the sweep starting end and thus will be difficult to accurately read. On the other hand, if a short sweep is used, although the short range pulses will occur in a more desirable position on the indicator, due to the fact that it is difficult to obtain a linear short sweep, there will be errors resulting from the non-linearities of the sweep. Another advantage of the long sweep in addition to linearity is the relatively small amount of power that is required. Thus, it would be advantageous to be able to display short range information on a long sweep.

In the present invention, a pulse generator which normally runs at the radar pulse repetition frequency (PRF) is controlled to have a phase lag behind the radar return or echo pulses. This lag is such that the generator pulses occur at a time from the transmitted radar pulses which is a known multiple of that of the echo or return pulses. When the phase relationships of the generator pulses or echo pulses change, the frequency of the generator is temporarily altered until the phase relationships are such that the desired known multiple time relationship is again attained. The generator pulses are applied to the indicator and since they occur at much later time than the echo pulses, they will be situated in a convenient section of the indicator. The calibration of the indicator is readily obtained by dividing the normal scale by the known multiple.

Accordingly, an object of the present invention is the provision of a circuit for presenting short range information on a long sweep.

Another object is to provide a circuit for producing pulses at the radar pulse repetition frequency which are made to occur, normally, at a time from the radar pulses which is a known multiple of the return or echo time of the received radar pulses.

A further object of the invention is the provision of a pulse generator for generating pulses at a radar PRF and a control system for controlling the phase of the generated pulses such that they automatically occur at a time from the radar output pulse which is a known multiple of the time for reception of the return or echo pulses.

Still another object is to provide a circuit for producing a pulse train having pulses whose time interval from the pulses of a reference pulse train is a known multiple of the time interval between the pulses from any other pulse train and the pulses of the reference pulse train.

Other objects and many of the attendant advantages of this invention will be readily appreciated as the same becomes better understood by reference to the following detailed description when considered in connection with the accompanying drawings wherein:

Fig. 1 shows a block diagram of a preferred embodiment of the invention.

Fig. 2 illustrates a representation on coordinate systems of the operation of the invention.

Fig. 3 is a block diagram of a radar system in which the invention has been incorporated.

Referring now to the drawings, wherein like reference characters designate like or corresponding parts throughout the several views, there is shown in Fig. 1 (which illustrates a preferred embodiment) an input terminal 11 for receiving a trigger pulse which occurs simultaneously with the radar transmitted pulse. This pulse is conducted by leads to the inputs of two linear sawtooth wave generators, 16 and 17, for triggering these generators into action. Although the amplitudes of the generated sawtooth waveforms, 18 and 19, from both generators, are equal and also less than the amplitude of echo pulse 20, the length or duration of sawtooth 19 is a known multiple (N) times the length or duration of sawtooth 18. The return or echo pulse 20 resulting from the transmitted radar pulse is received at terminal 21 and conducted to amplifier-clipper 24 which feeds the amplified and clipped video pulse into mixer 26. The resultant mixed signal 28 is fed to a peak detector 31 which gives a D. C. output which is proportional to either the peak of waveform 28 or the difference between the peaks of waveforms 28 and 18. The output sawtooth waveform 19 from generator 17 is mixed in mixer 41 with the clipped output wave 42 from blocking oscillator 43 and clipper 45. The clipping action of amplifier-clipper 24 and clipper 45 is such that pulses 20 and 42 have the same amplitudes. Waveform 51, the output of mixer 41, is conducted to peak detector 52 which produces a voltage which is proportional to either the peak of waveform 51 or the difference in peak values of waveforms 51 and 19. D. C. differential amplifier 53 produces a bias D. C. voltage which is proportional to the difference in D. C. voltages from peak detectors 31 and 52, and this bias voltage is then employed to bias free-running multivibrator 55 to control its phase. The output of multivibrator 55, which is at the PRF when the output from amplifier 53 is zero, is shaped through the action of blocking oscillator 43. It is to be realized that although the inputs to terminals 21 and 11 have been specified as radar pulses, they need not be. The only requirement that the two inputs to this circuit must meet is that they have the same pulse repetition frequency as the output from multivibrator 55.

In Fig. 2, the amplitude of waveform 28 is shown to be $V_2$ and that of waveform 51 to be $V_3$. The heights of waveforms 18 and 19 are both equal to $V_1$, and due to the clipping action the amplitudes of pulses 20 and 42 are equal (A). Since the length of waveform 18 is designated as T, then the length of waveform 19 must be NT. The time of occurrence of pulses 20 and 42 from the trigger pulse (origin) are $t_1$ and $t_2$, respectively.

At the instant of transmission of a radar pulse, a trigger pulse appears at terminal 11 and triggers sawtooth generators 16 and 17. The echo or return pulse 20 resulting from the radar pulse that originated the triggering action, is mixed in mixer 26 with sawtooth wave 18, and peak detector 31 gives a D. C. output, from the result of this, which is proportional to the peak of the video pulse 20 above the sawtooth wave 18 or to the peak alone. This D. C. voltage is thus a measure of the position of video pulse 20 along wave 18. The other sawtooth wave 19 is mixed in mixer 41 with the output of clipper 45. Peak detector 52 produces a D. C. output from the mixed signal 51 which is proportional to the peak of pulse 42 above the sawtooth wave 19 or to the peak alone and hence is a measure of the position of pulse 42 along sawtooth wave 19. When the D. C. outputs from the two peak detectors 31 and 52 are equal, the sharp pulse 42 will be delayed N times as far as pulse 20 from the trigger pulse. To ensure that the D. C. outputs are the same, the two are fed to D. C. differential amplifier 53 which produces an output which is proportional to the difference in the two inputs, and this output is used to bias the free-running multivibrator 55. When the two D. C. imputs are equal, there is no output from amplifier 53, and the free-running multivibrator runs at the PRF; however, when the phase of pulse 20 attempts to change without an accompanying change in the phase of pulse 42, or vice versa, the input to D. C. amplifier 53 is not zero and the phase of the multivibrator 55 will be altered by the resulting bias until the two D. C. inputs are again equal. The sawtooth 19 is employed as the indicator sweep and pulse 42 is used as a video pulse.

A representation of the operation of the circuit of Fig. 1 is shown by the coordinate systems of Fig. 2. Since the time of occurrence of the video pulse 20 after the trigger pulse is $t_1$ and that of pulse 42 is $t_2$, for proper operation, $t_2$ should equal $Nt_1$. The proof is as follows:

The D. C. input from detector $52 = K(V_3 - V_1)$ and from detector $31 = K(V_2 - V_1)$, where K is the constant of proportionality of the detectors.

But $$V_3 = t_2 \frac{V_1}{NT} + A$$

and $$V_2 = t_1 \frac{V_1}{T} + A$$

Setting the two D. C. inputs equal:

$$K\left(t_2 \frac{V_1}{NT} + A - V_1\right) = K\left(t_1 \frac{V_1}{T} + A - V_1\right)$$

Reducing and simplifying:

$$t_2 \frac{V_1}{NT} = t_1 \frac{V_1}{T}$$

or $$t_2 = Nt_1$$

Since the $-KV_1$ factor for the D. C. outputs of detectors 31 and 52 cancel each other, this factor does not have to be present; i. e. the same result would be obtained if the D. C. input from detector $52 = KV_3$ and that from detector $31 = KV_2$. Thus, it makes no difference if detectors 31 and 52 produce outputs proportional to the peaks of their input waves or to the amplitude difference of the components of their input waves.

The present system has been shown capable of multiplying the time interval between a pulse from one pulse train and a successive pulse from another pulse train which has the same pulse repetition frequency as the first pulse train. Although this system has general utility (e. g. it can be employed in analog computers and other similar devices), it is especially useful in radar units for presenting short range information on a long sweep. Through use of this system in a radar unit more accurate readings are obtained due to the central position of the pip and the linearity of the long sweep. Also less power is necessary to operate the long sweep than would be required for a short sweep. The PRF should have no smaller period than NT since only one video pulse can be used at a time. This requirement may restrict the circuit's use in some applications, however, it is quite adequate when using radar for sonobuoy or beacon plotting.

Referring now to Fig. 3 there are shown, in block form, the essential components of an elementary radar system. These comprise a transmitter 60 and a modulator 61 for pulsing the transmitter to cause it to generate time-spaced pulse signals of high frequency energy which are supplied through transmitter-receiver switch 62 to an antenna 63 by which they are radiated. Return pulses or echos of the transmitted pulses from target objects are also intercepted by the antenna 63 and are supplied through transmitter receiver switch 62 to the receiver 64. Modulator 61 also produces a trigger pulse simultaneously with the transmitted pulse produced by transmitter 60 which is coupled to an input terminal (terminal 11 of Fig. 1) of the sweep length multiplier 65. Also coupled to an input terminal (terminal 21 of Fig. 1) of the sweep length multiplier 65 is the output video pulse from receiver 64. Sweep length multiplier 65 operates in the manner described above in the description of Figs. 1 and 2 to provide short range information on a long sweep to the indicator 66.

Obviously many modifications and variations of the present invention are possible in the light of the above teachings. It is therefore to be understood that within the scope of the appended claims the invention may be practiced otherwise than as specifically described.

What is claimed is:

1. A radar sweep duration multiplier comprising first direct current producing means for producing a first direct current voltage which is proportional to the time of reception of an echo or return pulse from the initiating transmitted radar pulse, generating means for producing pulses at the radar pulse repetition frequency, second direct current means for producing a second direct current voltage which is proportional to the time difference between the generation of a pulse from said generating means and said transmitted radar pulse, direct current differential amplifying means for producing a bias voltage for said pulse generating means which is proportional to the voltage difference between said first and second direct current voltages whereby the pulse produced by the pulse generating means is delayed with respect to the transmitted radar pulse N times the time difference between the transmitted radar pulse and the echo or return pulse.

2. The radar sweep duration multiplier of claim 1 and means triggered synchronously with the transmission of a radar pulse for producing a sweep wave which is N times as long as a normal sweep wave.

3. A radar sweep duration multiplier comprising terminal means for receiving a trigger pulse upon transmission of a radar pulse, first means for producing a first peak voltage whose magnitude is proportional to the time of occurrence of a return pulse from an object which received the radar pulse, generating means for generating pulses at the radar pulse repetition frequency, second means for producing a second peak voltage whose magnitude is proportional to the time of occurrence of a pulse from said pulse generating means, and bias means for producing a bias voltage on said generating means for controlling the phase of the generated pulses, said bias voltage being proportional to the voltage difference between said first and second peak voltages, whereby the pulses generated by said pulse generating means are delayed with respect to the transmitted radar pulses N times the time difference between the transmitted radar pulses and the return pulses.

4. The sweep multiplier of claim 3 and means initiated synchronously with the radar pulses for producing sweep waves which are N times as long as normal sweep waves.

5. A sweep multiplier for a radar system having a pulse circuit for producing a trigger pulse upon transmission of a radar pulse, said sweep multiplier comprising: a terminal for receiving said trigger pulse; a first linear sawtooth generator connected to be triggered by said trigger pulses for producing a first sawtooth wave; a second linear sawtooth generator connected to be triggered by said trigger pulse for producing a second sawtooth wave having a period N times that of said first sawtooth wave, where N is any number; a first mixer for producing a first mixed signal of said first sawtooth wave and the return pulse from said radar pulse; first peak detector means for producing a first direct current voltage which is proportional to the difference in the peak value of said first mixed signal and said first sawtooth wave; a pulse generator which normally runs at the radar pulse repetition frequency; a second mixer for producing a second mixed signal of said second sawtooth wave and the pulse output from said pulse generator; second peak detector means for producing a second direct current voltage which is proportional to the difference in the peak value of said second mixed signal and said second sawtooth wave; direct current differential amplifier means for producing a bias voltage which is proportional to the difference between said first and second direct current voltages; and leads for applying said bias voltage to said pulse generator whereby the pulse generating means runs at the radar pulse repetition frequency upon the application of zero bias but if there is any change in the phase of the return pulse or the output of said pulse generator means, the frequency of said generator means is temporarily changed by the bias until the output pulse of said generator means is delayed N times as long from the corresponding radar pulse as is the return or echo pulse.

6. The circuit of claim 5, and clipping means for clipping said return pulse and said generator pulse so that both pulses have the same amplitude, and blocking oscillator means for shaping the output of said generator means.

7. The system of claim 6 wherein the pulse generator means is a free-running multivibrator.

8. A time interval multiplier for multiplying the time interval between a pulse from a reference pulse train and a successive pulse from another pulse train, said multiplier comprising: means for generating an output pulse train having the same pulse repetition frequency as said reference pulse train, and means responsive to said time interval for phasing said output pulse train such that the time interval between a pulse from said reference pulse train and a successive pulse from said output pulse train is a known multiple of the time interval between a pulse from said reference pulse train and a successive pulse from said another pulse train.

9. A time interval multiplier for multiplying the time interval between a first pulse and a second pulse from a first pulse train and a reference pulse train, respectively, said multiplier comprising: first direct current voltage producing means for producing a first direct current voltage which is proportional to the time interval between said first pulse and said second pulse; generating means for producing a second pulse train at the pulse repetition frequency of said reference pulse train; second direct current means for producing a second direct current voltage which is proportional to the time difference between said second pulse and a successive pulse from said second pulse train; direct current differential amplifying means for producing a bias voltage for said generating means which is proportional to the voltage difference between said first and second direct current voltages whereby each pulse produced by said generating means is maintained from each corresponding pulse of said reference pulse train at a multiple N, which is any number, of the time difference between said first pulse and said second pulse.

10. An electrical circuit comprising means to generate a video pulse, means to generate a first sweep pulse; means to generate a second sweep pulse having N times the duration of said first sweep pulse, where N is any integer, means to combine said video pulse and said first sweep pulse; means coupled to said last mentioned means and to said second sweep pulse generating means to provide a video pulse having a delay with respect to said first mentioned video pulse that is directly proportional to the difference between the durations of said first and second sweep pulses, and means to apply said second sweep pulse and said delayed video pulse to a cathode ray tube indicator.

References Cited in the file of this patent

UNITED STATES PATENTS

| 2,430,283 | Epstein | Nov. 4, 1947 |
| 2,432,453 | Skellett | Dec. 9, 1947 |
| 2,717,358 | Munster | Sept. 6, 1955 |